Patented Mar. 25, 1941

2,235,880

UNITED STATES PATENT OFFICE 2,235,880

POLISHING MATERIAL AND METHOD OF MANUFACTURING THE SAME

Otis Hutchins, Niagara Falls, N. Y., assignor to The Carborundum Company, Niagara Falls, N. Y., a corporation of Delaware No Drawing. Application April 6, 1939, Serial No. 266,425

7 Claims. (Cl. 51—308)

This invention relates to polishing materials and particularly to an improved bauxite polishing material and the method of producing the same.

One object of the present invention is to provide a polishing material that is inexpensive to produce.

Another object of the present invention is to provide a bauxite polishing material that will produce the desired finish on the material being polished quickly and with little effort.

Another object of the present invention is to provide a bauxite polishing material that is economical because of the quantity of work it will polish.

Other objects of the present invention will be apparent from the following disclosure.

According to the present invention, bauxite, which is an aluminous ore containing as much as 35% of combined water, is calcined to reduce the combined water to about 5% or less and then is ground, in the presence of added water, to the desired degree of fineness for use as a polishing powder.

A typical example of the manner in which the present invention is carried out is as follows. Arkansas bauxite is calcined to such a degree that its combined water content is reduced to less than 1% by weight. The resulting product has a composition represented by the following:

*Calcined Arkansas bauxite*

| | Per cent |
|---|---|
| $Al_2O_3$ | 85.39 |
| $Fe_2O_3$ | 4.88 |
| $SiO_2$ | 4.88 |
| $TiO_2$ | 4.26 |
| Combined $H_2O$ | .59 |
| | 100.00 |

After the bauxite has been calcined to the desired degree, for example, to a combined water content of 0.59% by weight, it is ground in the presence of added water until all of it will pass through a screen having approximately 200 meshes per linear inch, and about 80% of it will pass through a screen having 325 meshes per linear inch.

There are various means by which the calcined bauxite can be brought to the required state of subdivision. For example, it can be run through a tube mill, a conical mill, a roller mill or a rod mill, always, of course, together with added water. The various types of mills mentioned usually are continuous in operation; i. e. the material is fed continuously into one end of the mill and is discharged continuously from the other end, although they can be operated on the batch principle if desired. Another type of mill, which operates on the batch principle, that can be used to bring the calcined bauxite to a suitable state of subdivision when run wet is the ball mill.

It has been found that, for economical production, a tube mill operating on the continuous principle is very satisfactory for the purposes of the present invention, especially when operated in conjunction with a wet classifier that separates the material that is too coarse and returns it to the tube mill for further reduction in size.

As an example of the extent of the treatment of the calcined bauxite necessary for the production of a suitable polishing material, it may be pointed out that calcined bauxite as described above when passed through a six to eight (6 to 8) foot diameter and sixty (60) foot long tube mill at the rate of two to five (2 to 5) tons per hour, and in the presence of added water, will be converted into a highly satisfactory polishing material.

The wet ground, calcined bauxite is separated from the attending water by means of a filter press or a settling tank, or other suitable apparatus, is then dried to a water content of 1% or less and passed through a pulverizer to break up any lumps formed during the drying steps.

Bauxite treated as described above has been found to have valuable properties in respect to its use as a polishing material. When mixed with a suitable binder, it produces a polishing cake that has a higher rate of cut and a superior coloring power as compared with that ground dry.

It is not known why the wet ground bauxite is a better polishing medium than that ground dry, but one indication of the difference between the two materials is found in their respective oil or grease absorption characteristics. For example, the wet ground bauxite described above will absorb approximately 17% more kerosene or approximately 58% more stearic acid per unit weight than will the dry ground material.

The stearic acid absorption characteristics of the wet ground and dry ground materials are of somewhat more significance than their kerosene absorption factors because stearic acid is a material that is used extensively in the manufacture of polishing cakes.

These different absorption characteristics of the wet ground and dry ground materials are of considerable importance because they have a bearing upon the polishing characteristics of the polishing cakes made from the different materials. For example, in a comparative test of the two types of material, namely, the wet ground and the dry ground, it was found that it required 45% more polishing time to remove scratches from bronze work pieces when a polishing compound made from the dry ground material was used than was required when using a polishing compound containing the same kind of binder but the wet ground bauxite instead of the dry ground.

Specifically, the two types of polishing cakes used in the foregoing test had the following compositions:

|  | Dry crushed cake | Wet crushed cake |
| --- | --- | --- |
|  | Percent | Percent |
| Total bond | 18.0 | 23.5 |
| Tallow |  10.35 |  13.5 |
| Stearic acid |  7.65 |  10.0 |
| Dry crushed bauxite | 82.0 |  |
| Wet crushed bauxite |  | 76.5 |
|  | 100.0 | 100.0 |

The determination of the absorption characteristics of the various materials is accomplished in the following manner. One hundred grams of double press stearic acid (flaked) is placed in the top member of an ordinary household double boiler—the lower member of which is partially filled with water. The stearic acid is melted, and kept in the molten condition, by causing the water in the bottom of the double boiler to boil constantly during the test. When the stearic acid is completely fluid, the polishing material to be tested is slowly added thereto in diminishing amounts and the mixture is stirred constantly with a wooden spoon. When approximately 300 grams of the polishing powder have been added to the stearic acid the mixture will have changed progressively from a thin, mobile consistency—to that of a thick paste—to a number of small soft balls of the mixture. From this point to the end point the polishing powder is added in lots of approximately 10 grams each, still with constant stirring of the mixture. The end point is reached when the mixture first goes into one ball that is free from both the sides and bottom of the upper part of the double boiler. This ball should be a thorough mixture and should not be coated with the dry polishing powder.

The stearic acid absorption value of an abrasive powder is expressed as the number of grams of stearic acid required to absorb 100 grams of said powder. For example, if it is found that the addition of 460 grams of a certain abrasive powder to the 100 grams of stearic acid is necessary to arrive at the proper end point, then by the equation $$\frac{100}{460}=\frac{x}{100}$$

it will be found that this abrasive powder has a stearic acid absorption value of 21.74. Wet ground, calcined bauxite can have a stearic acid absorption as low as 18.0 and still be effective as a polishing agent. Dry ground bauxite, however, has a maximum stearic acid absorption value of approximately 15.0 and does not possess the desirable polishing characteristics possessed by a wet ground bauxite having a stearic acid absorption factor of 18.0 or greater.

The polishing powder of the present invention has many advantages over the materials previously used. Being low in silica it avoids the health hazards incident to the use of such materials as tripoli. It removes scratches and other blemishes from the surface of the work pieces quickly and is characterized by polishers as having a good "coloring" power. It is economical to produce and to use because, in addition to having fast cutting characteristics and good "coloring" power, it has high stearic acid absorption characteristics, which means that it will hold a large quantity of binder and therefore adhere well to the polishing tool to which it is applied.

Having thus described my invention, I claim:

1. The method of making polishing material which comprises calcining bauxite, and grinding the calcined bauxite in the presence of water to increase the absorptive power of the bauxite particles for an organic binder.

2. The method of making polishing material which comprises calcining bauxite to a water content of approximately 5% or less by weight, and grinding the calcined bauxite in the presence of water to increase the absorptive power of the bauxite particles for a stearic acid binder.

3. The method of making polishing material which comprises calcining bauxite to a water content of approximately 1% by weight, and grinding the calcined bauxite in the presence of water to increase the absorptive power of the bauxite particles for a stearic acid binder.

4. As a new article of manufacture, water ground calcined bauxite polishing powder having a substantially higher stearic acid absorption factor than dry ground calcined bauxite 5. As a new article of manufacture, water ground calcined bauxite polishing powder having a stearic acid absorption factor greater than 18.

6. As a new article of manufacture, water ground calcined bauxite polishing powder having a substantially higher stearic acid absorption factor than dry ground calcined bauxite and a binder therefor.

7. The method of reducing the scratching of partially polished metal surfaces in the process of finishing such surfaces with finely divided aluminous material, which method comprises calcining bauxite until the combined water content is less than one per cent, and grinding the calcined mass in the presence of added water until the resultant particles are adapted for fine polishing as evidenced by the possession of a larger stearic acid absorption factor than that possessed by dry ground bauxite.

OTIS HUTCHINS.